United States Patent [19]

Marriott

[11] Patent Number: 4,724,023
[45] Date of Patent: Feb. 9, 1988

[54] METHOD OF MAKING LAMINATED GLASS

[75] Inventor: Peter H. Marriott, Ashwood, South Africa

[73] Assignee: E M Partners AG, Zurich, Switzerland

[21] Appl. No.: 841,190

[22] Filed: Mar. 19, 1986

[30] Foreign Application Priority Data

Apr. 9, 1985 [ZA] South Africa ............ 85/2611
Dec. 6, 1985 [ZA] South Africa ............ 85/9348

[51] Int. Cl.[4] .......................................... B32B 17/00
[52] U.S. Cl. ............................ 156/102; 100/137;
156/99; 156/103; 156/104; 156/295; 156/312;
156/382; 156/535; 156/558; 156/572; 269/302
[58] Field of Search ............ 156/99, 104, 102, 295,
156/103, 312, 382, 572, 535, 558; 269/302;
100/137

[56] References Cited

U.S. PATENT DOCUMENTS 2,182,358 12/1939 Sherts et al. ............ 156/382
3,075,870 1/1963 Hedler et al. ............ 156/295
4,432,828 2/1984 Siempelkamp et al. ............ 156/382

FOREIGN PATENT DOCUMENTS 48-11588 4/1973 Japan ............ 156/295

Primary Examiner—John J. Gallagher
Attorney, Agent, or Firm—Ladas & Parry

[57] ABSTRACT

A method and apparatus for the laminating of glass is described. Glass sheets are transported by a gantry which places the sheet on a workstation. The glass sheet is allowed to dish and a second sheet is placed over the first sheet after depositing a resin on the first sheet. The trolley and the workstation from a press to complete the lamination process.

4 Claims, 7 Drawing Figures

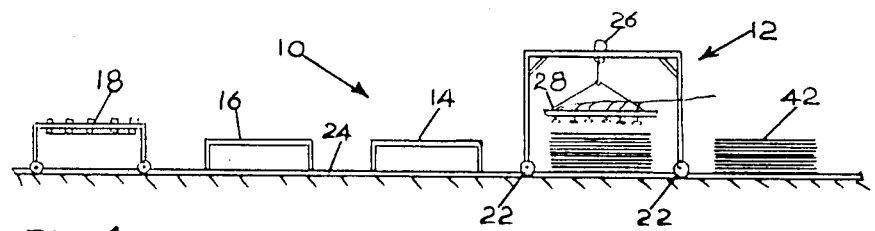
Fig 1
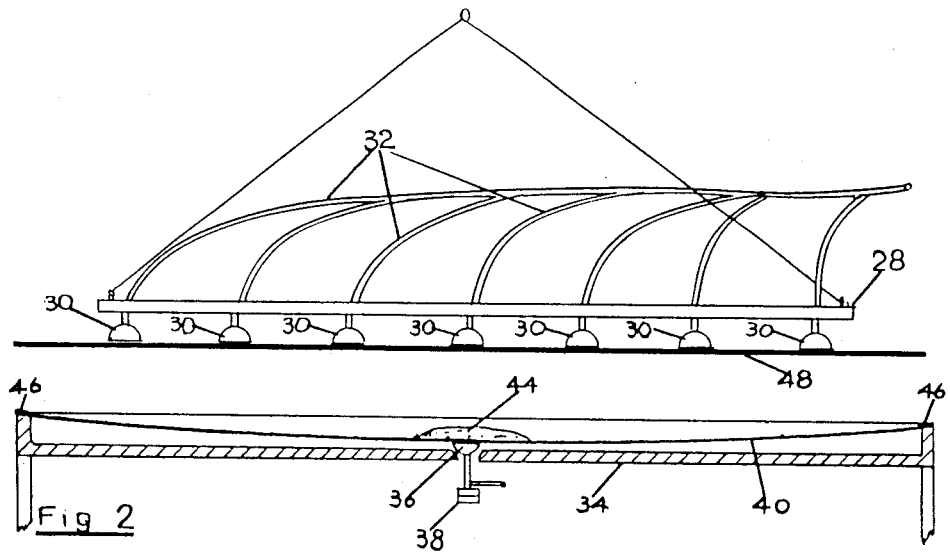
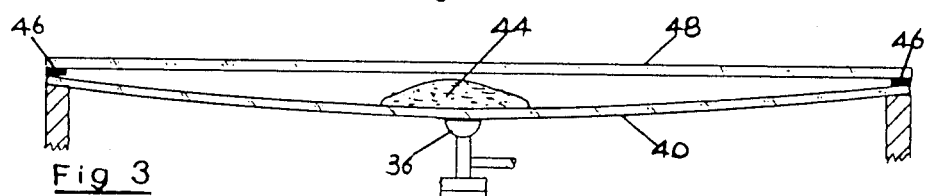
Fig 2
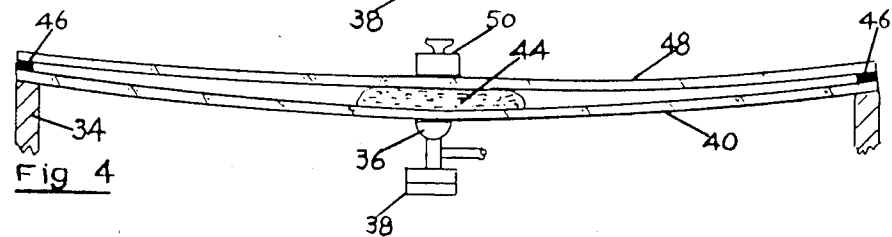
Fig 3
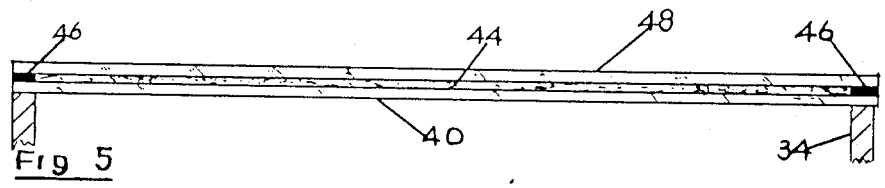
Fig 4
Fig 5

4,724,023

METHOD OF MAKING LAMINATED GLASS

FIELD OF THE INVENTION

This invention relates to laminated glass or other similar laminates including frangible or non-frangible materials or reinforced materials.

BACKGROUND OF THE INVENTION

The manufacture of laminated glass involves the introduction of a settable resin between two sheets of glass or other material.

In one method of manufacturing a glass laminate described in U.S. Pat. No. 4,234,533 (Langlands), the two sheets are held at an angle with two sides corresponding, a resin applied to the lower sheet and then the upper sheet is lowered, thereby lessening the angle and forcing the resin towards the free edges. Thus, the resin and the air tend to be expelled during the lowering step.

In another method described in European Patent Application No. 0 156 719 (Langlands) the two sheets are spaced apart and sealed peripherally, the seal being air permeable but liquid impermeable. The resin is introduced, preferably under pressure, the air between the sheets being expelled through the seal and the resin filling the space. Further pressure may be applied on either side of the laminate thus formed by means of a process to improve the adhesion and to expel the last traces of air and to confine the laminate to a predetermined thickness.

In French Patent No. 2 384 404 an apparatus and method of laminating glass is described in which resin is deposited on a flat lower sheet and an upper sheet is flexed outwardly and lowered onto the lower sheet to form the laminate. The resin used in this laminating process is not flowable and therefore remains as a blob on the flat lower sheet.

The important property or feature of laminated glass is that the resin must be uniformly applied otherwise zones or weakness occur and these can lead to unsatisfactory and even dangerous situations.

It is an object of the present invention to provide a method of forming a laminate which ensures an even thickness of the resin.

SUMMARY OF THE INVENTION

According to one aspect of the invention a method of laminating flat sheets of substantially rigid material comprises the steps of supporting a first sheet to form a concavity in a central zone, depositing a predetermined quantity of a settable composition in the concavity, locating a second sheet over the first sheet, sealing the edges of the sheets in a liquid impermeable and air permeable relationship prior to or after locating the second sheet, causing the first and second sheets to assume a planar position and applying sufficient pressure on the sheets for the resin and air to flow outwardly in the interspace between the sheets.

Preferably the method includes the step of laying the first and second sheets in a planar position in a vacuum chamber, and at least partially evacuating the chamber while allowing the resin to flow in the interspace between the sheets. Included is an additional step of forming concavity in the first sheet by applying downward pressure in a central zone of the sheet until a dish is formed. Further the method may include the step of locating a liquid impermeable and gas permeable tape on either the first or the second sheets, locating the second sheet over the first sheet and applying pressure in a central zone of the second sheet to cause the second sheet to contact the resin.

Preferably the method includes the step of forming a meniscus with the composition as the second sheet is applied to the composition.

According to a further aspect of the invention an apparatus for laminating flat sheets of a substantially rigid material includes spaced apart supports for receiving a first sheet, means for causing the first sheet to form a concavity in a central zone, positioning means for locating a second sheet over the first sheet and to move the sheets and means to apply pressure on the sheets.

Preferably the means to support the first sheet comprises a table top having raised sides onto which the sheet rests. The concavity in the first sheet is preferably formed by applying downward pressure to the sheet.

Preferably the means for positioning the second sheet over the first sheet comprises a gantry having a lifting mechanism and means to apply pressure on the sheets comprises a press.

BRIEF DESCRIPTION OF THE DRAWINGS

In the drawings:

FIG. 1 is a schematic side view of laminating apparatus according to the invention;

FIGS. 2 to 5 are schematic illustrations of a first work station with work in various stages of progress;

DESCRIPTION OF THE PREFERRED EMBODIMENT

Figure 6:
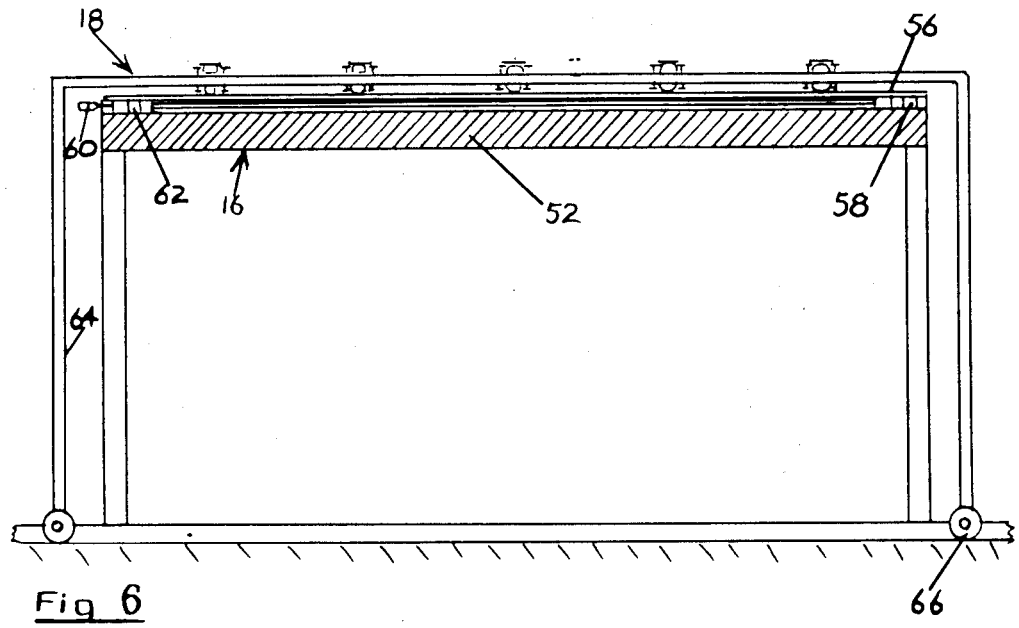
FIGS. 6 and 7 are schematic sections through a second work station showing work in progress.
Figure 7:
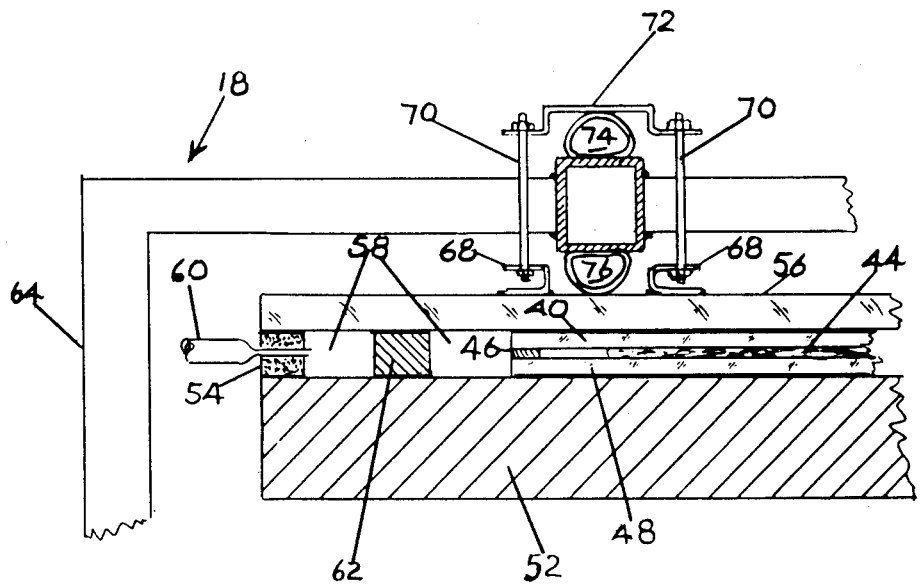

Referring to the drawings an apparatus for laminating glass 10 comprises a gantry 12 which moves over two workstations 14,16. A trolley 18 is mounted to operate over the workstation 16.

The gantry 12 comprises a rectangular frame having spaced apart legs at the ends of which are fixed castors 22 which slide in rails 24 embedded in the floor. The gantry 12 has a winch 26 from which is suspended a frame 28 having a plurality of suction caps 30 which are connected by hoses 32 to a vacuum source (not seen in the drawings).

The workstation 14 has a rectangular top 34 provided with raised sides. A suction cap 36 has a weight 38 and is connected to a source of vacuum (not seen in the drawings).

In use of the apparatus described thus far a sheet of glass 40 is picked up by the gantry 12 from a stack 42. Prior to being picked up the glass surface is thoroughly cleaned with a suitable solvent. The frame 28 is lowered onto the glass sheet 40 and the vacuum source is switched on for the glass sheet to adhere to the frame. The gantry is then moved to the workstation 14 where the glass sheet 40 is positioned on the frame 34 with the sheet resting on the edges of the frame. The suction cap 36 is fixed to the bottom of the glass sheet 40 and the vacuum source is again turned on. Downward pressure is applied to the weight 38 and this causes the glass sheet 40 to dish in a central zone as seen in FIG. 2. A measured quantity for a suitable resin 44 in liquid form is poured into the dish. A gas permeable and liquid impermeable strip of tape 46 is applied around the periphery of the glass sheet 40. Another sheet of glass 48 is located on top of the glass sheet 40 using the gantry 12. The tape 46 acts as a spacer between the sheets of glass 40,48. A weighted member 50 is placed on the sheet 48 and this causes it to dish and contact the resin 44. The convex lower face of the glass sheet 48 contacts the resin 44 and a meniscus is formed. The surface tension of the resin 44 is broken as the resin spreads in the area between the sheets 40,48.

Vacuum supply to the suction cap 36 is stopped and this causes the laminate of the sheets 40,48 to resume its flat shape as seen in FIG. 5. The laminate is moved to the workstation 16 using the gantry 12.

The workstation 16 has a top 52 with a neophrene sponge tape 54 onto which a platen 56 seats. The peripheral area between the top 52 and the platen 56 forms a vacuum chamber 58 which is connected by a conduit 60 to a vacuum source. A spacer 62 is located between the top 52 and platen 56 and this effectively determines the thickness of the laminate being formed.

The platen 56 is mounted on a frame 64 of the trolley 18 having castors 66 which ride in the rails 24. The platen 56 is fixed to brackets 68 which are connected by bolts 70 passing through the frame 64 to cover plates 72. Upper and lower air bags 74,76 are fixed on either side of the frame 64 and between the platen 56 and coverplate 72. The air bags 74,76 are connected to a source of air under pressure (not seen in the drawings).

The laminate formed by the sheets 40,46 is placed on the top of the workstation 16 and the trolley 18 is positioned over the workstation 16. The platen 56 is lowered for seating on the tape 54 by deflating the bags 74 and inflating the bags 76. This causes even pressure to be applied on the laminate. Simultaneously, air from the chamber 58 is evacuated through the conduit 60. The resin 44 spreads rapidly between the sheets 40,48 due to evacuation of air through the tape 46. After the resin 44 has spread evenly and throughout the area between the sheets 40,48 the laminate is removed from the workstation 16 and the resin allowed to set. It has been found that the laminate thus formed is free of any air bubbles in the resin between the glass sheets.

I claim:

1. A method of laminating flat sheets of glass comprising the steps of forming a concavity in a central zone of a first sheet by applying force to the sheet, depositing a predetermined quantity of a settable composition in the concavity, locating a second sheet over the first sheet, applying a sealant which is liquid impermeable and air permeable on the first or second sheet prior to or after locating the second sheet on the first sheet, causing the first and second sheets to assume a planar position and applying sufficient pressure on the sheets for the resin and air to flow outwardly in the interspace between the sheets.

2. A method of laminating glass according to claim 1 including the step of laying the first and second sheets in a planar position in a vacuum chamber, and at least partially evacuating the chamber while allowing the resin to flow in the interspace between the sheets.

3. A method according to claim 1 wherein the sealant comprises a liquid impermeable and gas permeable tape applied on either the first or the second sheets, said method including the step of applying pressure in a central zone of the second sheet located over the first sheet to cause the second sheet to contact the resin.

4. A method according to claim 1 which includes the step of forming a meniscus with the composition as the second glass sheet is located over the first glass sheet and allowed to contact the composition.

* * * * *